United States Patent Office 3,705,052
Patented Dec. 5, 1972

3,705,052
GLASS FIBER REINFORCED ELASTOMERS
Alfred Marzocchi, Cumberland, R.I., assignor to
Owens-Corning Fiberglas Corporation
Filed Dec. 16, 1970, Ser. No. 98,641
Int. Cl. C03c 25/02
U.S. Cl. 117—72
42 Claims

ABSTRACT OF THE DISCLOSURE

This invention is addressed to a method for enhancing the bonding relationship of glass fibers to elastomeric materials when the glass fibers are combined with elastomeric materials in the manufacture of glass fiber-reinforced elastomer products wherein glass fibers are first treated to provide a metal oxide on the surfaces thereof, and are thereafter treated to provide a thin coating of a xanthate or a carbamate on the glass fiber surfaces with the result that they may be combined directly with the elastomeric materials, or they may be treated in the form of a bundle with an elastomer compatible impregnant.

---

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination wtih the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as homopolymers or copolymers of cis-1,3-butadiene, such as butadiene-styrene copolymer, butadiene-acrylonitrile copolymer, chloroprene, isoprene, neoprene, isobutyl rubber, nitrile rubbers and the like, elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkenyl or alkylidene norbornene, such as 5-alkylidene-2-norbornene and the like in which the alkylidene group numbers from 2–12 carbon atoms, and polysulfone rubber.

The invention is addressed to the fuller utilization of the desirable characteristics of glass fibers, such as their high strength, flexibility, thermal stability, chemical stability, inertness, electrical resistance and heat conductive characteristics, when used in combinations with elastomeric materials as a reinforcement or as a stabilizing agent in the manufacture of belts, as reinforcing cords and fabrics to increase strength, life, wearability, and service characteristics in rubber tires, and as a reinforcement and the like in other elastomeric coated fabrics and molded elastomeric products.

It is an object of this invention to provide a new and improved method for the treatment of glass fibers to enable fuller utilization to be made of the desirable characteristics of the glass fibers when used in combination with elastomeric materials in the manufacture of glass fiber-reinforced molded products and coated fabrics.

More specifically, it is an object of this invention to provide a method for the treatment of glass fibers to improve the processing and performance characteristics of glass fibers as a reinforcement for elastomeric materials to enhance their bonding relationship when used in combination with elastomeric materials in the manufacture of glass fiber-reinforced laminates or coating fabrics.

These and other objects and advantages of the invention will appear hereinafter, and, for purposes of illustration, but not of limitation, an embodiment is shown in the accompanying drawing in which.

Figure 1:
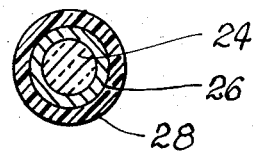
FIG. 1 is a cross-sectional view of a glass fiber processed in accordance with the concepts of the present invention.

Until recently, glass fibers which have been added to otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties were made available from the combinations which made use of glass fibers in products formed of elastomeric materials. It is believed that the failure to make fuller utilization of some of the more desirable properties of the glass fiber components resides in the inability properly to integrate the glass fibers wtih the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The concepts of the present invention reside in glass fibers or in the treatment of glass fibers to provide the glass fibers with surfaces containing ions of iron, cobalt, chromium or magnesium, preferably in the form of the corresponding metal oxide or compounds which are convertible to the oxide, whereby the metal oxide becomes strongly bonded to the glass fiber surface to form a part thereof. Thereafter, the glass fibers are further treated with a xanthate or a carbamate which is believed to form a complex with the metal ion on the glass fiber surfaces which operates to securely intertie the elastomeric material with which the glass fibers are subsequently combined in the manufacture of glass fiber reinforced rubber products. After treatment with the xanthate or carbamate, the glass fibers may be combined directly with elastomeric materials in the manufacture of glass fiber-reinforced elastomeric products, or they may be processed into strands, yarns, cords or fabrics, hereinafter referred to as bundles, and impregnated with an elastomer compatible material prior to combination of the impregnated bundle with elastomeric materials.

It has been found that good results are obtained when the metal ion or oxide is present in an amount within the range of 0.1–4% by weight, and preferably 0.3–0.7% by weight, of the glass fibers. When in the form of a metal oxide, this can be achieved by the treatment of the glass fibers with a solution containing from 0.25–5.0% by weight of the compounds from which the metal oxide is derived. Application may be made from aqueous solutions of any of a variety of soluble salts of the metal or metal hydroxide. An application made in the form of a salt, such as the chloride treatment of the coated fibers for adjustment to alkaline pH, operates to deposit the metal as the hydroxide on the glass fiber surfaces which in turn can be converted to the oxide by heat. Alternatively, it is also possible to coat the fibers directly with the metal hydroxide in the form of a double salt with ammonia or a tetraorgano ammonium hydroxide for subsequent conversion to the corresponding metal oxide in response to heat. Thereafter the glass fiber may be treated with the xanthate or carbamate whereby a complex metal xanthate or carbamate is formed. Application of the xanthate or carbamate may be made by treatment of the glass fiber containing the metal ion or oxide on the surface with a solution containing 1–15% of the xanthate or carbamate so as to deposit the xanthate or carbamate on the treated glass fiber surfaces in an amount within the range of 0.1–10% by weight of the glass fiber system.

The following examples will serve to illustrate the principal concepts of the present invention.

EXAMPLE 1

Treating composition

| | Percent by wt. |
|---|---|
| $FeCl_3 \cdot 6H_2O$ | 1.5 |
| Water | 98.5 |

The above composition, having a pH of about 4, is applied onto the individual glass fiber surfaces by means of a wiper pad or the like, preferably after the original size applied to the glass fiber surfaces has been removed either by washing or heat cleaning at a temperature of 950–1100° F. In the alternative, the composition may be applied onto the bare glass fibers in forming. The coating is rendered alkaline by adjustment to a pH above 7 to convert the ferric chloride on the glass fiber surfaces to ferric hydroxide. Thereafter, the coated glass fibers are dried and heated to a temperature of 250 to 700° F. to convert the ferric hydroxide to ferric oxide.

The glass fibers are thereafter treated with the following composition:

| | Percent by wt. |
|---|---|
| Potassium ethyl xanthate | 3.0 |
| Water | 97.0 |

Application of the xanthate may be made by means of a wiper pad which is constantly wet with the above composition, or by passing the glass fibers through a bath formed of the solution. After the glass fibers are allowed to dry, they are found to contain 0.55% by weight of the xanthate.

The resulting glass fibers are schematically illustrated in FIG. 1 of the drawing wherein the potassium ethyl xanthate 28 is present on the surfaces 26 of the glass fibers 24.

It will be understood that a wide variety of other xanthates may be employed in place of the potassium ethyl xanthate illustrated in Example 1. Suitable xanthates are those having the general formula:

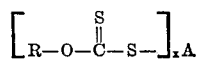

wherein R is alkyl having 1–10 carbon atoms, such as methyl, ethyl, isopropyl, isobutyl, etc. or cellulose, A is a metal, hydrogen, an ammonium cation or a quaternized ammonium cation having the general formula:

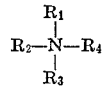

wherein $R_1$, $R_2$, $R_3$ and $R_4$ are each selected from the group consisting of alkyl having 1–10 carbon atoms, such as methyl, ethyl, propyl, etc., alkanolyl having 1–9 carbon atoms, such as hydroxy methyl, hydroxy ethyl, etc., phenyl, benzyl, cycloalkyl having 4–8 carbon atoms, such as cyclopentyl or cyclohexyl, and $x$ corresponds to the valence of A which is preferably an integer between 1–3.

It is generally preferred to employ a xanthate wherein A is an alkali or alkaline earth metal, such as sodium, potassium, lithium, calcium, barium or magnesium. In addition a wide variety of other metal xanthates may also be used, such as the xanthates of iron, cobalt, nickel, chromium, titanium, copper, zinc and tin.

Representatives of suitable xanthates include sodium isopropyl xanthate, potassium ethyl xanthate, magnesium isobutyl xanthate, isopropyl xanthatic acid, ferric ethyl xanthate, nickel methyl xanthate, cupric ethyl xanthate, cellulose xanthatic acid, tetramethyl ammonium isopropyl xanthate, tetramethanol xanthate, trimethyl benzyl ammonium isopropyl xanthate, as well as a wide variety of others.

EXAMPLE 2

The glass fibers treated in Example 1 are combined with natural rubber in the ratio of 1 to 10% by weight of glass fibers to 99 to 90% by weight of the elastomer. The fibrous component can be admixed with the rubber or otherwise laid in a pre-determined arrangement between layers of uncured rubber for subsequent cure under heat and pressure to form the molded product. The molding is carried out in accordance with conventional conditions for heat and pressure, such as, for example, a temperature of 350°–400° F. and a pressure of between 10 and 100 pounds per square inch.

EXAMPLE 3

A treating composition is formulated as follows:

| | Percent by wt. |
|---|---|
| $CoCl_2$ | 2.0 |
| Water | 98.0 |

The foregoing solution is applied to glass fibers in the manner described in Example 1 so as to provide a cobalt oxide coating constituting 0.5% by weight of the glass fibers.

Thereafter, the glass fibers are treated with the following composition:

| | Percent by wt. |
|---|---|
| Sodium isopropyl xanthate | 4.0 |
| Water | 96.0 | in the manner described in Example 1. The resulting glass fibers contain 0.8% by weight of the xanthate.

Glass fibers treated in accordance with Example 3 may be combined with an elastomer, such as rubber or neoprene rubber as illustrated in Example 2, or they may be impregnated with an elastomer compatible impregnant in accordance with the method disclosed in U.S. Pat. No. 3,424,608, as illustrated by the following examples.

EXAMPLE 4

A glass fiber bundle is treated in accordance with the method shown in Example 1 except that the metal treating composition comprises magnesium chloride and the xanthate is isobutyl xanthic acid.

After the xanthic acid has been applied to the glass fiber surfaces to form the xanthic acid magnesium complex, the glass fiber bundle is impregnated with the following composition:

|  | Percent by wt. |
|---|---|
| Natural rubber latex-resorcinol formaldehyde resin (38% solids-"Lotol") | 30.0 |
| Water | 70.0 |

Application of the foregoing impregnant is made in an amount to deposit any solids constituting 5–25% by weight of the glass fiber system, and preferably 10–15% by weight.

Figure 2:
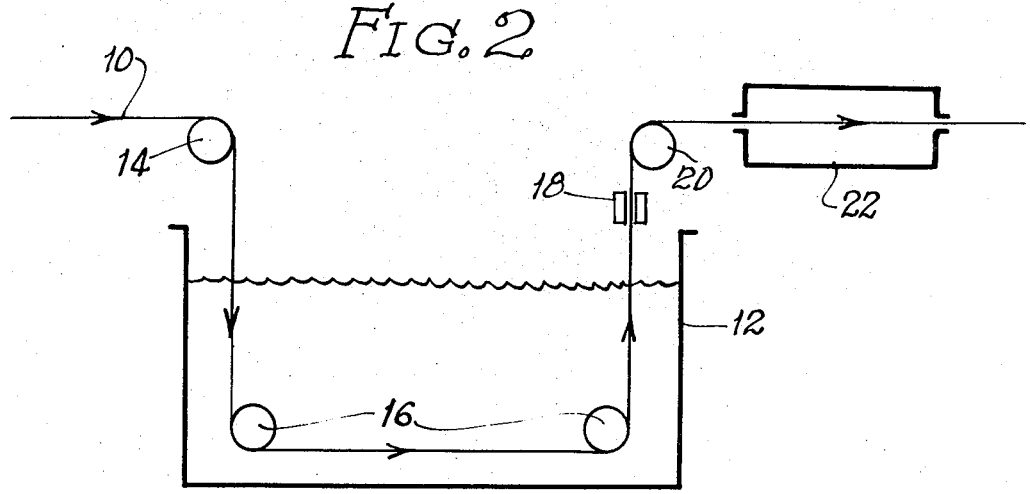
FIG. 2 is a flow diagram illustrating the treatment of glass fibers subsequent to their being formed into strands, yarns, cords and fabrics to impregnate glass fiber bundles in which the individual glass fibers have been treated in accordance with the practice of this invention.
Figure 3:
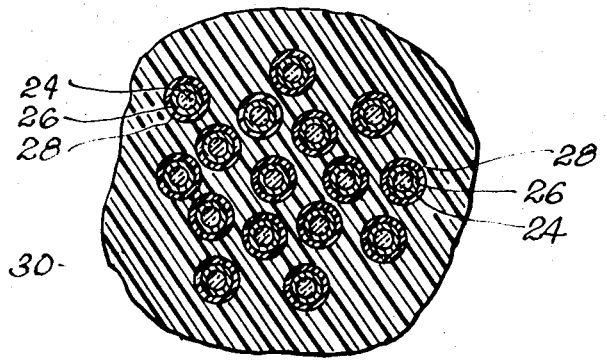
FIG. 3 is a cross-sectional view of glass fiber processed in accordance with the diagram illustrated in FIG. 2.

Impregnation with the aqueous composition of Example 4 can be made by conventional means for impregnating, such as by immersion of the bundle of glass fibers in a bath of aqueous impregnating composition. Referring more specifically to FIG. 2 of the drawing, the glass fiber bundle 10 is advanced over roller 14 for passage downwardly into the bath 12 containing the impregnating composition. The bundle is then turned under roller 16 to effect a sharp bend which operates to open the bundle to enable fuller penetration of the aqueous impregnating composition into the bundle of treated glass fibers for fuller impregnation of the bundle. The impregnated bundle is then raised from the bath for passage through a roller or die 18 which operates to remove excess impregnating composition from the bundle and to work the impregnating composition into the bundle. Thereafter, the endless bundle is advanced over roller 20 into a drying oven 22, preferably in the form of an air drying oven maintained at a temperature of 150–350° F. to accelerate removal of the aqueous diluent and to set the impregnated material in situ in the glass fiber bundle. Drying will occur in a relatively short period of time, ranging form 1–30 minutes, depending somewhat upon the temperature of drying.

Suitable resorcinol aldehyde resins and combinations thereof with natural rubber latex are marketed by the U.S. Rubber Company under the trade name "Lotol." For the preparation of such materials, reference can be made to Canadian Pat. No. 435,754, wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

A wide variety of other elastomer compatible impregnants may be employed in lieu of the resorcinol formaldehyde latex employed in Example 4. For example, it is possible to employ a vinyl pyridine (at 15% by weight)-butadiene (at 70% by weight)-styrene (15% by weight) terpolymer impregnant of the type disclosed in the aforementioned patent, as illustrated in the following example.

EXAMPLE 5

Glass fibers are treated in accordance with the method disclosed in Example 4, except that the metal salt treating composition comprises chromic chloride and the xanthate is tetramethyl ammonium ethyl xanthate.

After the tetramethyl ammonium ethyl xanthate has been applied to the glass fiber surfaces to form the xanthate-chloride complex, the glass fibers are processed into a bundle which is impregnated with the following composition:

|  | Parts by wt. |
|---|---|
| Resorcinol formaldehyde resin | 2–10 |
| Formaldehyde (37% solution) | 1–3 |
| Concentrated ammonium hydroxide | 2–5 |
| Vinyl pyridine terpolymer (42% solids) | 15–50 |
| Neoprene rubber latex (50% solids) | 25–50 |
| Butadiene latex (60% solids) | 5–15 |
| Alkali metal hydroxide | .05–0.2 |

Water is incorporated with the foregoing materials in amounts to produce an impregnating composition having a minimum solids content of 10% and a maximum solids content of about 50% by weight. Introduction should be made in an amount to impregnate with a dry solids of 5–25% by weight of the glass fiber system and preferably 10–15% by weight.

It will be understood that the foregoing impregnating composition can be modified by the omission of the resorcinol formaldehyde resin.

In accordance with another concept of the present invention, it is also possible to employ a carbamate in place of the xanthate which similarly forms a complex with the metal present in the metal oxide on the glass fiber and thereby operates to intertie the glass fiber surfaces to the elastomeric material. The concept of the invention may be illustrated by the following examples.

EXAMPLE 6

A metal salt treating composition is formulated as follows:

|  | Percent by wt. |
|---|---|
| $FeCl_3 \cdot 6H_2O$ | 2.0 |
| Water | 98.0 |

Treatment of the glass fibers with the above to deposit ferric oxide on the surfaces thereof may be carried out in the manner described in Example 1.

Thereafter, the glass fibers containing ferric oxide on the surfaces thereof are treated with the following composition:

|  | Percent by wt. |
|---|---|
| Sodium carbamate | 3.2 |
| Water | 96.8 |

Application of the above may be made in the manner illustrated in Example 1 with reference to the xanthate. Upon drying, the glass fibers are found to contain .65% by weight of the carbamate in the form of a complex with the iron atoms in the ferric oxide.

Glass fibers processed in accordance with the above example may then be combined directly with elastomeric materials in the manufacture of glass fiber reinforced elastomeric products in accordance with the procedure described in Example 2 whereby the carbamate complex operates to securely intertie the glass fiber surfaces to the elastomeric material.

It will be understood that a wide variety of other carbamates may be employed in place of the sodium carbamate used in Example 6. Carbamates generally suitable for use in the present invention are those having the general formula:

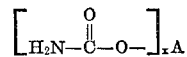

wherein A and x are the same as previously described.

Other illustrations of this concept of the present invention may be illustrated by the following examples.

EXAMPLE 7

The glass fibers treated in Example 6 are combined with neoprene rubber in the ratio of 1–10% by weight of treated glass fibers to 99–90% by weight of the neoprene elastomer. The treated glass fibers can be admixed with the neoprene rubber or otherwise laid in a pre-determined arrangement between layers of rubber of neoprene for subsequent cure under heat and pressure to form the molded product. Then molding is carried out in accordance with conventional conditions for heat and pressure, such as, for example, a temperature of 350–400° F. and a pressure of 10–100 lbs. per square inch.

EXAMPLE 8

The procedure of Example 6 is repeated except that the metal salt treating composition contains cobalt chloride, and the carbamate treating composition contains calcium carbamate.

EXAMPLE 9

The procedure of Example 6 is again repeated except that the metal salt treating composition contains chromic chloride and the carbamate treating composition contains ferric carbamate.

As will be understood, glass fibers treated in accordance with the methods disclosed in Examples 8 and 9 may be combined directly with elastomer materials in the manufacture of glass fiber-reinforced elastomeric products, and they may be impregnated with elastomer compatible impregnant in the manner described in Examples 4 and 5. This concept may be illustrated by the following example.

EXAMPLE 10

Glass fiber in the form of strands from which the size applied in forming has been removed are passed through a bath of magnesium hydroxide in solution in an aqueous medium containing magnesium hydroxide in a concentrate of about 1% by weight. From the bath the treated strands are passed through a drying oven and heated to a temperature of about 500° F. to remove the diluent and to set the impregnant as the oxide on the glass fiber surfaces.

Thereafter, the glass fibers containing magnesium oxide on the surfaces are treated with the following composition:

| | Percent by wt. |
|---|---|
| Tetraethyl ammonium carbamate | 3.5 |
| Water | 96.5 |

Application of the foregoing carbamate treating composition may be made in the manner illustrated in Example 6. Upon drying, the glass fiber strand is treated with the following impregnant composition:

| | Percent by wt. |
|---|---|
| Natural rubber latex-resorcinol formaldehyde resin (38% solids—"Lotol") | 35.0 |
| Water | 65.0 |

Application of the foregoing impregnant is made in the amount to deposit dry solids within the range of 5–25% by weight, and preferably 10–15% by weight, of the glass fiber system.

EXAMPLE 11

The procedure of Example 10 is repeated except that the impregnant composition is the vinyl pyridine-butadiene-styrene terpolymer impregnant system described in Example 5.

The impregnant composition of Example 5 is applied to the glass fibers in the manner described in Example 4 to deposit dry solids within the range of 5–25% by weight in the treated glass fiber bundle.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat and compression or by vulcanization for advancement of the elastomeric material in the glass fiber-elastomeric product.

It will be apparent that I have provided a new and improved method for use in the treatment of bundles of glass fibers to enhance their integration with elastomeric materials in the manufacture of glass fiber-elastomeric products.

It will be understood that invention exists not only in the treated glass fibers for use with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

What is claimed is:

1. Glass fibers having a metal oxide on the surfaces thereof, and a thin coating on said oxide, said coating comprising a compound selected from the group consisting of a xanthate having the formula

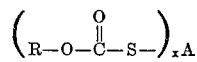

wherein R is a monovalent organic radical, A is selected from the group consisting of hydrogen, an ammonium radical, a quaternized ammonium radical and a metal, and $x$ corresponds to the valence of A, and a carbamate having the formula

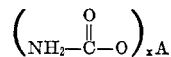

wherein R is a monovalent organic radical, A is selected from the group consisting of hydrogen, an ammonium radical, a quaternized ammonium radical and a metal, and $x$ corresponds to the valence of A.

2. Glass fibers as defined in claim 1 wherein said metal is selected from the group consisting of iron, cobalt, chromium and magnesium.

3. Glass fibers as defined in claim 1 wherein said metal oxide constitutes at least a monomolecular layer on said glass fiber surfaces.

4. Glass fibers as defined in claim 1 wherein said metal oxide constitutes 0.1 to 4.0% by weight based upon the weight of the glass fibers.

5. Glass fibers as defined in claim 1 wherein said coating constitutes .1 to 10% by weight of the glass fiber-metal oxide system.

6. Glass fibers as defined in claim 1 wherein said metal oxide constitutes 0.3 to 0.7% by weight based upon the weight of the glass fibers.

7. Glass fibers as defined in claim 1 wherein said compound is a xanthate.

8. Glass fibers as defined in claim 1 wherein A is a metal selected from the group consisting of alkali and alkaline earth metals, iron, cobalt, chromium and magnesium.

9. Glass fibers as defined in claim 1 wherein said compound is a carbamate.

10. Glass fibers as defined in claim 1 wherein A is a metal selected from the group consisting of alkali and alkaline earth metals, iron, cobalt, nickel, chromium, titanium, copper, zinc and tin.

11. A glass fiber bundle comprising a plurality of glass fibers, said glass fibers having a metal oxide on the surfaces thereof and having a thin coating comprising a compound selected from the group consisting of a xanthate having the formula

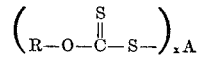

wherein R is a monovalent organic radical, A is selected from the group consisting of hydrogen, an ammonium radical, a quaternized ammonium radical and a metal, and $x$ corresponds to the valence of A, and a carbamate having the formula

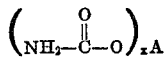

wherein R is a monovalent organic radical, R is selected from the group consisting of hydrogen, an ammonium radical, a quaternized ammonium radical and a metal, and $x$ corresponds to the valence of A, and an impregnant in said bundle, said impregnant comprising an elastomer compatible material.

12. A glass fiber bundle as defined in claim 11 wherein said elastomer compatible material is resorcinol aldehyde latex.

13. A glass fiber bundle as defined in claim 11 wherein said elastomer compatible material is a vinyl pyridine-butadiene-styrene terpolymer.

14. A glass fiber bundle as defined in claim 11 wherein said impregnant constitutes 5–25% by weight of said glass fiber bundle.

15. A glass fiber bundle as defined in claim 11 wherein said impregnant constitutes 10–15% by weight of said glass fiber bundle.

16. A glass fiber bundle as defined in claim 11 wherein said metal is selected from the group consisting of iron, cobalt, chromium and magnesium.

17. A glass fiber bundle as defined in claim 11 wherein said metal oxide constitutes at least a monomolecular layer on said glass fiber surfaces.

18. A glass fiber bundle as defined in claim 11 wherein said metal oxide constitutes 0.1 to 4.0% by weight based upon the weight of the glass fibers.

19. A glass fiber bundle as defined in claim 11 wherein said coating constitutes .1 to 10% by weight of the glass fiber-metal oxide system.

20. A glass fiber bundle as defined in claim 11 wherein said metal oxide constitutes 0.3 to 0.7% by weight based upon the weight of the glass fibers.

21. A glass fiber bundle as defined in claim 11 wherein said compound is a xanthate.

22. A glass fiber bundle as defined in claim 11 wherein A is a metal selected from the group consisting of alkali and alkaline earth metals, iron, cobalt, chromium and magnesium.

23. A glass fiber bundle as defined in claim 11 wherein said compound is a carbamate.

24. A glass fiber bundle as defined in claim 11 wherein A is a metal selected from the group consisting of alkali and alkaline earth metals, iron, cobalt, nickel, chromium, titanium, copper, zinc and tin.

25. In the manufacture of glass fiber reinforced elastomeric products wherein an elastomeric material comprises the continuous phase in which the glass fibers are distributed, the treatment which is effective to establish a strong bonding relationship between the glass fibers of the elastomeric material comprising providing glass fibers having a metal oxide on the surfaces thereof, treating said glass fibers with a composition containing a compound selected from the group consisting of a xanthate having the formula

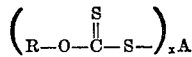

wherein R is a monovalent organic radical, A is selected from the group consisting of hydrogen, an ammonium radical, a quaternized ammonium radical and a metal, and $x$ corresponds to the valence of A, and a carbamate having the formula

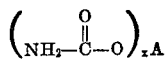

wherein R is a monovalent organic radical, A is selected from the group consisting of hydrogen, an ammonium radical, a quaternized ammonium radical and a metal, and $x$ corresponds to the valence of A, whereby said compound forms a complex with the metal of said metal oxide.

26. A method as defined in claim 25 wherein said metal is selected from a group consisting of iron, cobalt, chromium and magnesium.

27. A method as defined in claim 25 wherein said metal oxide is formed by treating the glass fibers with a salt of said metal, adjusting the pH of said salt to precipitate the hydroxide of said metal on said glass fiber surfaces and heating hydroxide for conversion to the glass metal oxide.

28. A method as defined in claim 25 wherein said metal oxide is formed by treating said glass fibers with an aqueous composition containing the hydroxide of said metal, and heating the hydroxide for conversion to the corresponding oxide.

29. A method as defined in claim 25 wherein said metal oxide constitutes at least a monomolecular layer on said glass fiber surfaces.

30. A method as defined in claim 25 wherein said metal oxide constitutes 0.1 to 4.0% by weight based upon the weight of the glass fibers.

31. A method as defined in claim 25 wherein said compound is a xanthate.

32. A method as defined in claim 25 wherein A is a metal selected from the group consisting of alkali and alkaline earth metals, iron, cobalt, chromium and magnesium.

33. A method as defined in claim 25 wherein said compound is a carbamate.

34. A method as defined in claim 25 wherein A is a metal selected from the group consisting of alkali and alkaline earth metals, iron, cobalt, nickel, chromium, titanium, copper, zinc and tin.

35. A method as defined in claim 25 which includes the step of admixing the treated glass fibers with an elastomeric material and curing the mixture of said glass fibers and elastomeric material at elevated temperatures and pressures to thereby form a glass fiber-reinforced elastomeric product.

36. A method as defined in claim 25 which includes the step of impregnating the treated glass fibers in the form of bundles with an elastomer compatible impregnant.

37. A method as defined in claim 36 wherein said impregnant is resorcinol aldehyde latex.

38. A method as defined in claim 36 wherein said impregnant is vinyl pyridine butadiene-styrene terpolymer.

39. In a glass fiber reinforced elastomeric product in which an elastomer constitutes a continuous phase in which the glass fibers are distributed, the improvement in the bonding relationship between the glass fibers and the elastomer comprising glass fibers having a metal oxide on the surfaces thereof and a thin coating on said oxide, said coating comprising a compound selected from the group consisting of a xanthate having the formula

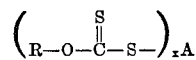

wherein R is a monovalent organic radical, A is selected from the group consisting of hydrogen, an ammonium radical, a quaternized ammonium radical and a metal, and $x$ corresponds to the valence of A, and a carbamate having the formula

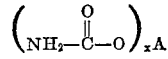

wherein R is a monovalent organic radical, A is selected from the group consisting of hydrogen, an ammonium radical, a quaternized ammonium radical and a metal, and $x$ corresponds to the valence of A.

40. A product as defined in claim 39 wherein the metal is selected from the group consisting of iron, cobalt, chromium and magnesium.

41. A product as defined in claim 39 wherein the glass fibers are combined with said elastomer in the form of individual fibers.

42. A product as defined in claim 39 wherein the glass fibers are combined with said elastomer in the form of a bundle of a plurality of glass fibers, said bundle containing an elastomer compatible impregnant.

References Cited

UNITED STATES PATENTS

| | | | |
|---|---|---|---|
| 3,232,782 | 2/1966 | Shannon | 117—126 GF |
| 2,985,548 | 5/1960 | Blickwedel. | |
| 3,480,572 | 11/1969 | Buchanan et al. | 260—172 |

OTHER REFERENCES

Coucouvanis, D.: "Synthesis and Study of Metal Complexes With Sulfur Containing Ligands" (Abstract) 68B Dissertations Abstract, 2318 (1967).

WILLIAM D. MARTIN, Primary Examiner

D. COHEN, Assistant Examiner

U.S. Cl. X.R.

117—126 GF, 126 GQ, 126 GB, 85